March 1, 1960

S. GALLEE 2,927,206

SWITCH CONTROLLED COUNTING SYSTEM

Filed Jan. 11, 1956

3 Sheets-Sheet 1

INVENTOR
S. GALLEE

BY

R P Morris
ATTORNEY

March 1, 1960 S. GALLEE 2,927,206

SWITCH CONTROLLED COUNTING SYSTEM

Filed Jan. 11, 1956 3 Sheets-Sheet 2

INVENTOR

S. GALLEE

BY R. P. Morris

ATTORNEY

March 1, 1960 S. GALLEE 2,927,206

SWITCH CONTROLLED COUNTING SYSTEM

Filed Jan. 11, 1956 3 Sheets-Sheet 3

INVENTOR
S. GALLEE

BY R. P. Morris
ATTORNEY 2,927,206

SWITCH CONTROLLED COUNTING SYSTEM

Stanislaus Gallee, Berlin-Zehlendorf, Germany, assignor to International Standard Electric Corporation, New York, N.Y., a corporation of Delaware Application January 11, 1956, Serial No. 558,500

Claims priority, application Germany February 3, 1955

2 Claims. (Cl. 250—27)

The invention concerns a circuit arrangement that serves to count pulses, and it makes use, preferably, of binary switch systems as the basic elements of the counting circuitry.

In the prior counting circuits with binary switch elements a division number $2^n$ is obtained by means of $n$ such elements connected in series.

The meaning of this division number is that after the counting of $2^n$ pulses a secondary pulse is produced. In the known methods a division number other than $2^n$ is obtained through returning the secondary pulse to the input of the divider circuitry. The secondary pulse consequential upon $2^n$ switch actions causes the counting system to become switched before the next following counting period sets in, so that now only $2^n—1$ pulses will be necessary to produce the secondary pulse. This principle permits any desired division number to be obtained by omitting the respective number of binary switch systems or elements and, eventually, returning the secondary pulse to several of the binary switch elements joined in series.

The prior arrangements have the drawback that the speed of switching is limited because of their use of impulse feedback. The reason for such limitation is that the switch action produced by the feedback pulse must be interposed by it between two regular switch actions, the pulse counter thus having to work at double the pulse number during the same space of time.

Pulse-counting circuits have an upper limit of speed. Therefore, with the use of impulse feedback the number of switch actions possible per unit time is at least halved in order that the speed at which the control pulses follow upon each other may be such as to permit an ancillary pulse to become readily interposed between them.

To avoid this drawback it has been proposed to provide for division numbers other than $2^n$, such as the number 3, and to have these provided in such a manner that the output pulse is conveyed to the binary switch element not for effecting an intermediate switch action but in order to suppress the next following regular switch action. For this purpose it is proposed to amplify the output pulse and return it as a positive feedback pulse. In consequence of its polarity, this pulse does not initiate any intermediate switch action but produces a grid current such that the binary switch element is blocked for a certain period, the blocking being caused by a negative charge remaining on the grids. The regular control pulse corresponding to that space of time will thus be suppressed, so as not to become effective.

This mode of pulse-counting does not require an interval of time to be provided for intermediate pulses, so the highest speed of the pulse-counter will not be diminished.

Also it has been proposed to change the division number from $2^1+1=3$ to $2^n+a$ by passing over some of the binary divider elements conencted in series. The value $n$ results from the number of divider elements so omitted. The value $a$ is defined by the storage time of the grid charge.

This mode of pulse-counting is suitable only for certain sequence periods of the pulses. Fluctuations of the impulse sequence-time which are in the order of from 1:10 to 1:20 are permissible, but sequence periods of any length can not be dealt with in this way. Besides certain difficulties, arising from the divider element itself, are experienced in an attempt to have the number $a$ raised beyond value 1.

By means of the present invention pulse counters are so arranged as to permit any desired division numbers and impulse sequence-times of any desired length to be provided with the aid of the hereinbefore described features of pulse suppression.

The invention may be applied to a circuit arranged to divide frequencies by way of pulse counting effected with the aid of binary switch systems, in particular those employing odd division numbers, and a feature of the invention consists in the use of a pulse counter with a change-over switch joined to its output and arranged to disconnect the pulse-counter input from the source of control pulses and also to disconnect itself from the pulse-counter output while connecting its own control means to the source of control pulses, the control pulse, or one of the ensuing control pulses, acting to restore the change-over switch to normal.

The above-mentioned and other features and objects of this invention and the manner of attaining them will become more apparent and the invention itself will be best understood by reference to the following description of an embodiment of the invention taken in conjunction with the accompanying drawings, in which.

Figure 1:
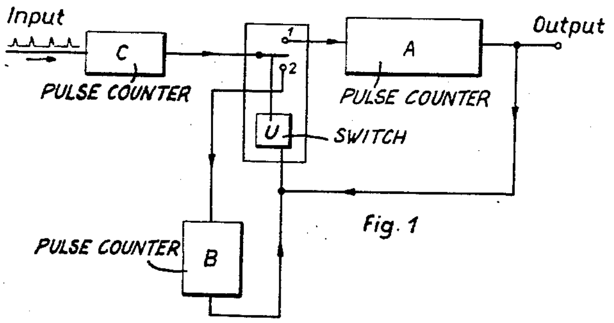
Fig. 1 is a block diagram illustrating the principle of the invention.

In the arrangement shown in Fig. 1 the pulse counter A proper has a change-over switch U joined to its output. The switch U is operated by the secondary pulse sent by the counter A to disconnect the control pulses from the counter A and to connect them to the switch U, so that the next pulse will restore the switch to normal again. After the switch has operated under control of the counter control pulses will be ineffective with respect to counter A until the particular control pulse following the change-over operation has restored the switch U to normal.

In this way the suppression of one control pulse for each counting period of A is brought about. The division number is $a+1$.

According to another feature of the invention an additional pulse counter B is included in the restoring lead for switch U. Owing to this ararngement the switch U will not be restored to normal until $b$ control pulses have been suppressed, so the division number will be $a+b$.

If now a pulse-counting system of any type and of the division number $c$ is joined to the entire arrangement, so as to be either preconnected to it or connected to the output thereof, then the total division number will be of the value $T=c(a+b)$. Thus, any desired division number can be provided.

The change-over switch U may be constituted by any well-known means, such as relays, binary switch systems, systems of amplifier tubes, or magnetic saturation cores, that is means, which in dependence on the respective state of switching act to control the path for the control pulses.

This arrangement operates as follows:

The control pulses entering the pulse counter C cause a secondary pulse to be produced each time a certain number $c$ of these primary pulses have been effective in C. Switch U at first has its contact 1 closed, so the pulse counter A is operated by that secondary pulse and those ensuing. After a certain number $a$ of secondary pulses from C have become effective in the pulse counter A, this in its turn produces a secondary pulse. This pulse is conveyed to switch U and causes the binary switch system thereof to be changed over. Hence U opens its contact 1 and closes contact 2.

Consequently the secondary pulses from C will no longer operate the counter A but will operate the pulse counter B or, in the case $b=1$, will operate the switch U directly.

By means of the first control pulse from B to U the binary switch system thereof is changed over so as to open contact 2 and to close contact 1. Thus, the original state of U has been reestablished. The counting operation can hence recommence.

Accordingly, in order to have one secondary pulse supplied to the output of A, $c(a+b)$ primary pulses into C are necessary.

Figure 2:
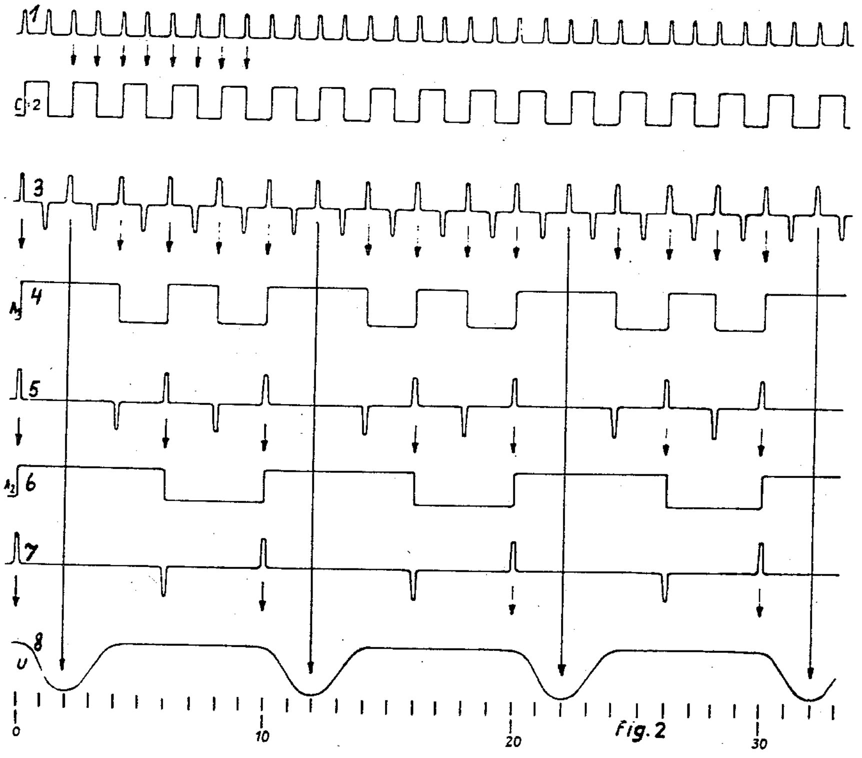
Fig. 2 are graphs illustrating the behavior of the voltages peculiar to various points of the arrangement shown in Fig. 1.

These proceedings will be understood from Fig. 2, showing an impulse-sequence diagram. This diagram relates to a decade divider whose division number is defined by $c=2$, $b=1$, $a=4$ and is hence $2(4+1)=10$. The train of input pulses is designated 1. The pulse counter C contains but a single binary system by which the secondary pulses indicated in curve 2 and their differentiated pulses indicated in curve 3 are produced. The pulse counter A has two binary systems in series which produce respectively the secondary pulses and their integrated pulses indicated in curves 4 and 5 and the secondary pulses and their integrated pulses indicated in curves 6 and 7. The arrows in the diagram illustrate the interdependence to which the pulses are subject, on the one hand, by the fixed part of the circuitry and, on the other hand, by switch U. The switching state of U is illustrated by the impulse succession of curve 8.

As $b=1$, the control pulses from C will not be delayed in their action. Owing to the great deformation of the pulses that appears from graph 8, Fig. 2, the binary switch system of U may have a time constant much higher, or a counting-frequency limit much lower, than that of the first switch system of A. Therefore the limit of the counting speed will not be impaired by the pulse-suppressing circuitry. The limiting frequency of the pulse counter thus equals that of purely binary switch systems not employing a feedback pulse.

The inventive circuitry can be so constructed that the pulse counters A, B, C may be constituted by any suitable design of counters, and they may be either mechanical or electric counters. If electric, they may be in the nature of magnetic, static, or electronic systems arranged in conformity with the storage system, or the ring system, or the binary system, etc. What is essential is merely that the departure from the given basic division number of a divider system is accomplished through pulse suppression, the output pulse causing a binary system to be switched over, which then acts to divert the control input from the counter to itself in such a manner that either the next following control pulse or one of those ensuing shall restore the said binary system to normal and thereby cause the control pulses to reoperate the counter.

Figure 3:
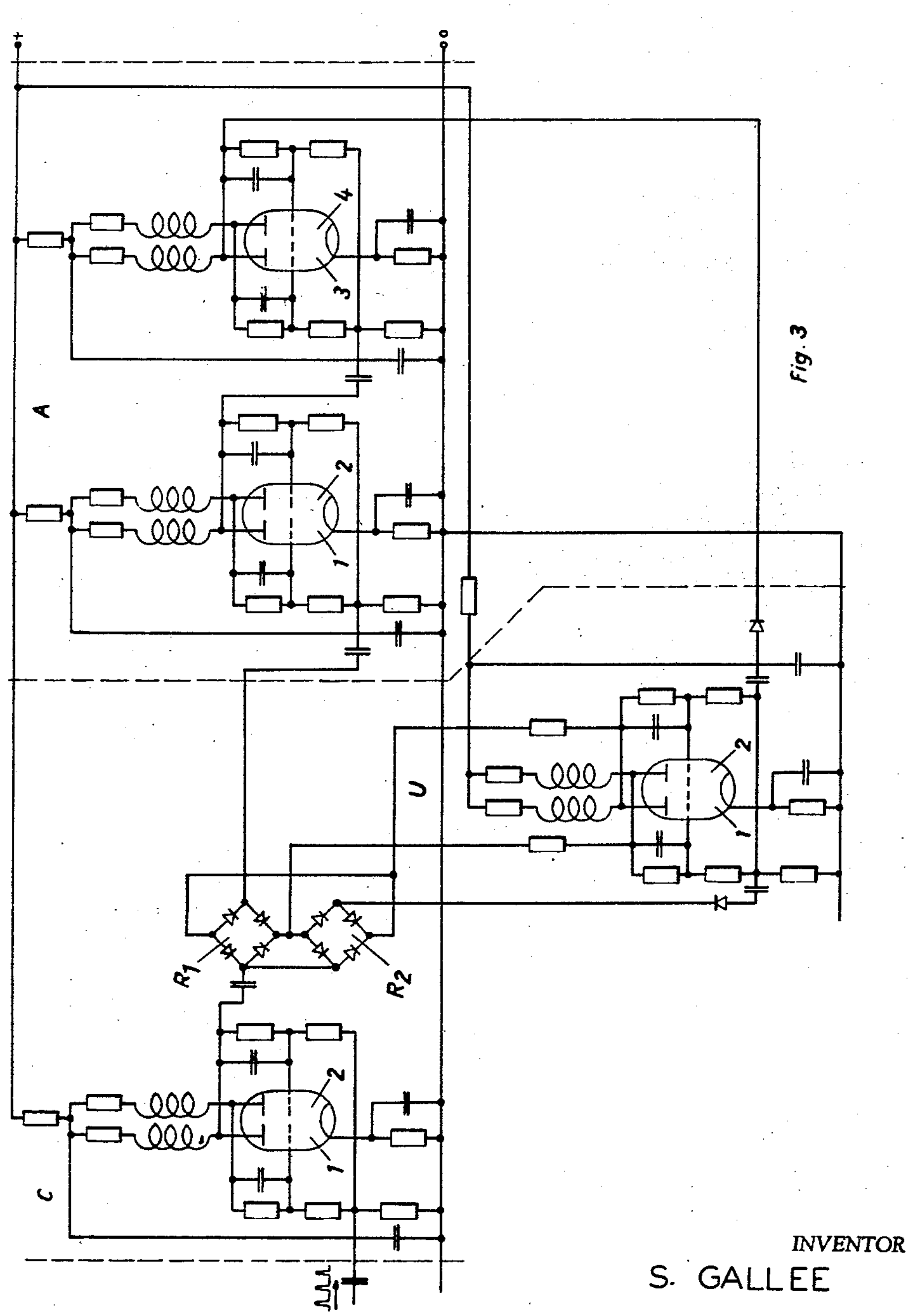
Figs. 3 and 4 show two embodiments of the invention that employ electron tubes.

If the circuit is formed of electromechanical devices such as relays the binary switch element may be constituted by a special electromagnetic relay that has two at-rest positions. This construction is suitable for none but low speeds of counting. Fig. 3 shows the invention as practised with the aid of electron tubes. This arrangement can deal with switch successions higher than $10^7$ per second. An Eccles-Jordan switch serves for each binary switch element, there being one such switch in counter C, two in counter A, and one in the switch-over unit U. The switching-over of the pulse control is effected with the aid of ring modulators R1 and R2 controlled by the anode circuits of the Eccles-Jordan divider. The symmetric construction of the change-over switch U prevents the operation of switching-over from becoming evaluated by pulse counter A. The pulse counter B has here been omitted, so the arrangement will count in decadal fashion.

Incoming pulses cause the tubes C1 and C2 of the Eccles-Jordan circuit in the counter C to go on and off alternatively in a well-known manner. The anode circuit of the tube C1 sends the pulse to either counter A or switch U depending on whether the ring modulator circuit R1 or R2 is operated. These ring modulators are controlled by the condition of operation of tubes U1 and U2 of the Eccles-Jordan circuit of the switch U. If the tube U1 is off and the tube U2 is on, current will flow through the ring modulator R1 permitting a pulse from the anode of C1 to pass through it to the first Eccles-Jordan circuit of the counter A comprising the tubes A1 and A2. If the tube U1 is on and the tube U2 is off, current will flow through the ring modulator circuit R2 and this circuit will pass a pulse from the anode of C1 to the Eccles-Jordan circuit of the switch U.

The Eccles-Jordan circuits of the counter A are connected in series, a pulse from the anode of tube A1 controlling the operation of tubes A3 and 4 to produce the count of four in the counter. A pulse from the anode circuit of A3 is delivered to the Eccles-Jordan circuit of the switch U to reverse the operation of this circuit so that ring modulator R1 is closed and ring modulator R2 is open. This permits the next pulse from the anode circuit of tube C1 to reverse the operation of the tubes U1 and U2 to open the ring modulator R1 and close the ring modulator R2.

Fig. 3, as explained above, shows ring modulators arranged to initiate the switching-over of the pulses. Instead of such modulators, electron tubes under control of Eccles-Jordan dividers may be provided.

Figure 4:
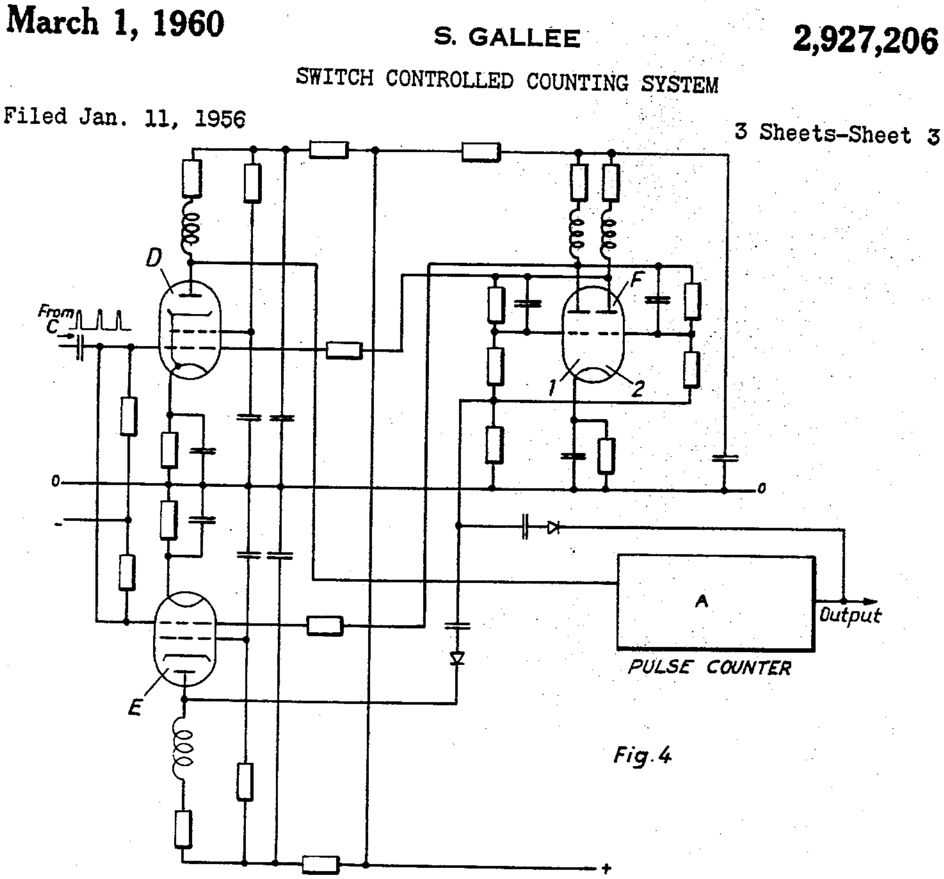

Thus, an arrangement of two amplifier tubes D and E, as represented in Fig. 4, may be used. The grid biasses of these tubes are controlled from the anode circuits of tubes F1 and F2 comprising an Eccles-Jordan circuit similar to those already referred to. When the tube F1 is operating, the grid of tube E will be biased so negative by the anode voltage of F1 as to prevent the operation of E under control of an incoming pulse from counter C. When the tube F2 is operating, the anode voltage will bias the grid of tube D sufficiently to prevent its operation by the incoming pulses from counter C. The Eccles-Jordan circuit F is in turn controlled by a pulse from the output of counter A to shift it to a position where tube D is prevented from operating and tube E is permitted to operate. The next pulse then coming from counter C will cause the operation of tube E and a pulse will be transmitted from the anode of tube E to the Eccles-Jordan circuit F to cause its reversal, so that subsequent pulses from counter C will operate the tube D instead of the tube E.

The arrangement of Fig. 4 has the advantage that the change-over operation is most effectively prevented from reacting on counter A. These two tubes D and E also act to amplify the pulses arriving from C and to diminish the capacitive load on the pulse counter C, so this circuitry permits the attainment of speeds of switching which are particularly high.

Figure 5:
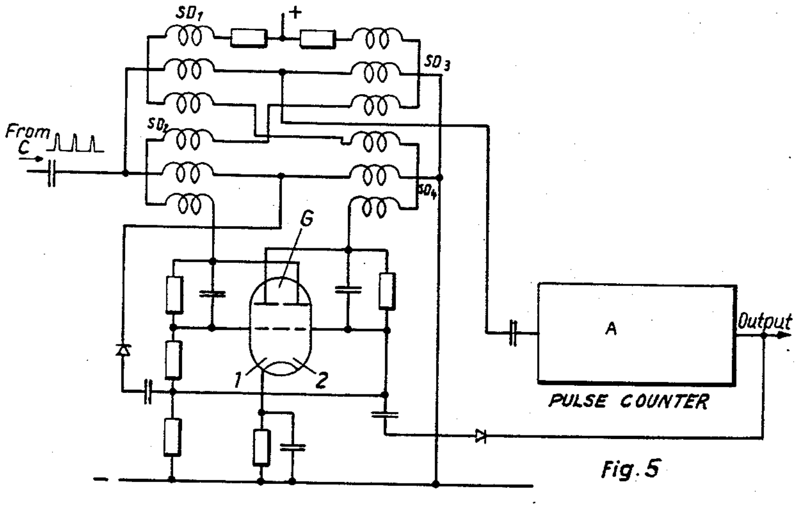
Fig. 5 represents an embodiment thereof comprising saturated chokes.

Still another arrangement shown in Fig. 5, comprises saturation chokes whose permeability is controlled by the anode current of the Eccles-Jordan divider. The chokes SD1, SD3, SD2, SD4 constitute a voltage divider for the control pulses from C. The division ratio of this divider is varied by the two choke groups SD1, SD3 and SD2, SD4 acting in mutual opposition.

Pulses from the counter C will be permitted to pass through the voltage divider arrangements provided by the chokes SD1–SD4 when one of the tubes 1 or 2 of the Eccles-Jordan circuit G is operating and the other is off, while pulses are prevented from passing to counter A when the operation of tubes G1 and G2 is reversed. In the reversed condition however pulses from C may pass through the voltage divider arrangement of saturation chokes to reverse the operation of tubes G1 and G2. The effect is similar to the switch operation explained in connection with Fig. 4.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A circuit arrangement for pulse division comprising: a first pulse counter having an input, and an output; a second pulse counter having an input and an output; a two-position change-over switch having a control means, an input terminal, a first output terminal connected to the input of said first pulse counter, and a second output terminal connected to said second counter; a source of pulses connected to the input terminal of said switch; a connection from the output of said first counter to said control means whereby output pulses from said first counter change the output position of said switch from said first counter to said second counter; a connection from said second counter to said control means whereby pulses from said second terminal change the output position of said switch from said second counter to said first counter, and means for extracting pulses from the output of said first pulse counter as the output of said circuit arrangement.

2. A circuit arrangement, as defined in claim 1, in which the said switch control means comprises ring modulators connected between the input terminal and the two output terminals of said switch and a bistable circuit for alternately rendering said modulators conductive.

References Cited in the file of this patent

UNITED STATES PATENTS

| | | |
|---|---|---|
| 2,421,018 | De Rosa | May 27, 1947 |
| 2,521,789 | Grosdoff | Sept. 12, 1950 |
| 2,577,015 | Johnson | Dec. 4, 1951 |

FOREIGN PATENTS

| | | |
|---|---|---|
| 584,422 | Great Britain | Jan. 14, 1947 |
| 596,670 | Great Britain | Jan. 8, 1948 |